Oct. 14, 1958  H. J. DE WINDT  2,856,065

CONVEYOR FLIGHT BELT

Filed Nov. 17, 1954

INVENTOR.
HERBERT JOHN DeWINDT

BY

ATTORNEYS

United States Patent Office 2,856,065
Patented Oct. 14, 1958

2,856,065

CONVEYOR FLIGHT BELT

Herbert John de Windt, Grand Rapids, Mich., assignor to Ton-Tex Corporation, Grand Rapids, Mich., a corporation of Michigan Application November 17, 1954, Serial No. 469,410

6 Claims. (Cl. 198—198)

This invention relates to conveyor or elevator belts, and particularly to conveyor belts having upstanding flights or cleats for holding material on a moving belt. More particularly, the invention is concerned with multi-ply fabric belts in which a plurality (usually five or more) of plies or layers of fabric, such as cotton duck or canvas, are cemented together in a laminated structure by vulcanization, and the flights are similarly constructed of vulcanized laminated fabric secured to the belt by vulcanization. The invention aims to provide an improved flight belt of this type and method of making the same.

In the flight belt of the invention, the flights are formed of a vulcanized laminated fabric structure of the same type as the belt itself. In the preferred aspect of the invention, this structure is made up of four fabric plies cemented together by vulcanization, each ply being of the same weight as the plies of the belt proper. One of the outside plies is stripped off, leaving a three-ply structure. Four spaced cuts are then made through two plies on the stripped side of the structure, and by stripping the two plies at the opposite ends of the structure and between the intermediate cuts there results three longitudinally spaced sections of reduced thickness (i. e. one ply thick) separated by the two three-ply thick unstripped sections. The length of the intermediate one-ply section is approximately the same as the combined thickness of the three-ply sections, while the end sections of reduced thickness are relatively long. The two three-ply thick sections are folded into contact with each other with a layer of cement between the contacting surfaces, and with the single uncut ply on the outside. The one-ply thick end sections are oppositely bent to lie in the same plane at right angles to the contacting thick sections, and the one-ply thick bent sections of the resulting T-shaped structure are fitted into a mating cut-out recess (one ply deep) in the belt and secured thereto by vulcanization.

Figure 1:
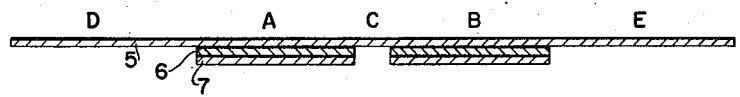
Figure 2:
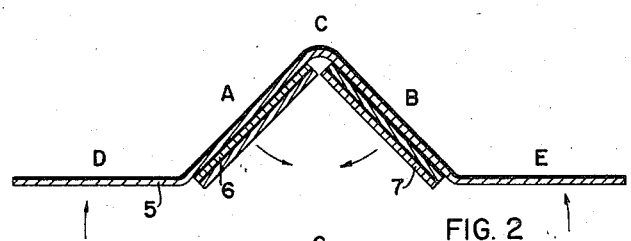
Figure 3:
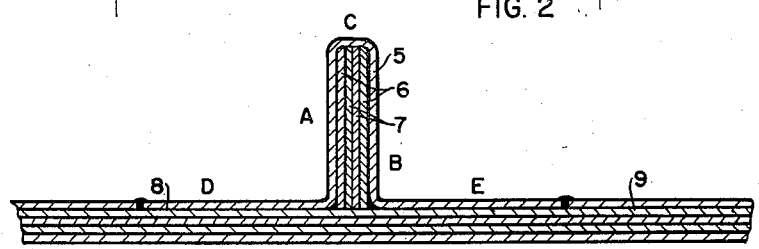
Figure 4:
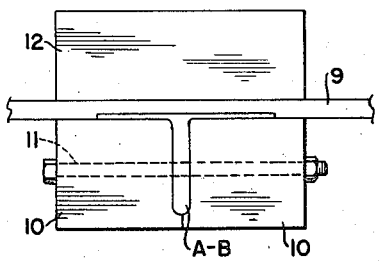
Figure 5:
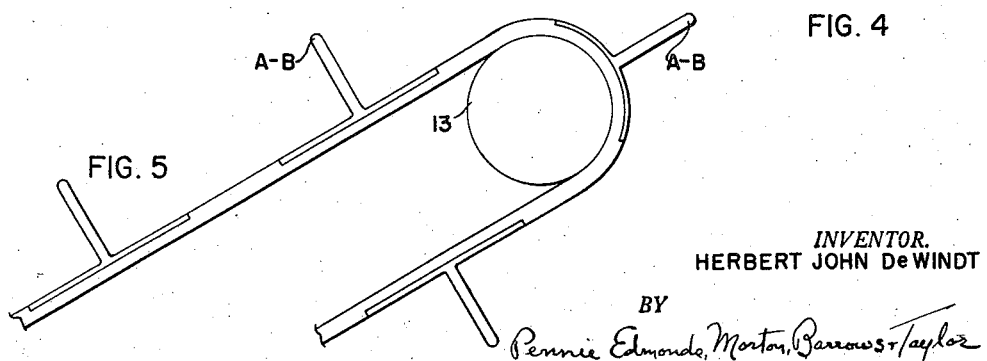

The foregoing and other novel features of the invention will be better understood from the following description taken in conjunction with the accompanying drawing in which:

Fig. 1 is a sectional elevation of a stripped blank for forming a flight,

Fig. 2 is a sectional elevation of the stripped blank in a partially folded and bent back state, Fig. 3 is a sectional elevation of a completely formed flight fitted into the cut-out mating recess of the belt, Fig. 4 is an explanatory diagrammatic view of one form of vulcanizing press used in securing the flight to the belt, and Fig. 5 is a side elevation of the upper end of an inclined endless conveyor flight belt.

The stock for constructing the upstanding flights is a vulcanized laminated fabric structure like the belt itself, and preferably is made up of four plies or layers of fabric, although this is not essential so long as the stock has at least two plies that can be cut and stripped in accordance with the invention. The fabric for the flight stock is of the same weight as the fabric in the plies of the belt proper, and the fabric plies are cemented together in a laminated structure by vulcanization. In the interest of simplicity, the flight stock is herein described and illustrated as a four-ply laminated structure, and the belt is shown with five fabric plies.

Referring now to Fig. 1 of the drawing, there is shown the cut and stripped blank for forming a flight. Initially, the structure had four fabric plies, and the outer ply on one side was stripped off, leaving three plies 5, 6 and 7. Then by cutting through two plies, on the stripped side, in four places, and stipping off the two outer and the middle sections, the blank of Fig. 1 is obtained. This blank is of the same width as the belt to which it is to be secured, and has two relatively long three-ply sections A and B separated by a narrow (short) one-ply section C, with a relatively long one-ply section (D and E) on the other or outer side of each three-ply section A and B. The sections D and E are of adequate length to firmly secure the flight form to the belt, and may conveniently be of about the same length. The sections A and B are necessarily of the same length, their length determining the height of the flight. The length of the section C is approximately equal to the combined thickness of the sections A and B, so that when the latter are folded into bonding contact the continuous outside ply 5 will cover the upper ends of the sections A and B.

The exposed surfaces of the plies 7 of the sections A and B are coated with a rubber-type cement, e. g. neoprene, and folded into bonding contact with each other, with the continuous or uncut ply 5 on the outside. The one-ply thick end sections D and E are then bent in opposite directions until they lie in the same plane and at right angles to the contacting and bonded sections A and B. Fig. 2 of the drawing shows approximately the mid-position of these folding and bending operations, the arrows indicating the directions of folding and bending of the four sections A, B, D and E. The final result is an inverted T-shaped flight form of which the sections D and E constitute the base and the bonded together sections A and B consitute the upstanding flight, and the ply 5 constitutes a continuous back-up ply on the outside of the flight.

A recess 8 is cut one-ply deep in the belt 9. This recess is of the same shape and dimensions as the combined sections D and E plus approximately the intervening six-ply thickness of the base of the flight. The recess and contacting surfaces of the sections D and E are coated with a rubber-type cement and the mating parts are fitted together. The end joints between the mating parts are preferably coated with a thin layer of the cement. The flights are then secured to the belt by vulcanization.

Fig. 4 of the drawing diagrammatically illustrates the usual vulcanization procedure. The flights (A—B) are clamped between aluminum blocks 10 by means of end bolts 11, and the belt and blocks are placed in a hot vulcanizing press of which only the upper plate 12 is shown. Pressure is thus provided in two directions, first to force the flight into the recess in the belt and second to force the sections A and B into bonding contact.

The plies are vulcanized into the body of the belt and are hence securely bonded thereto with no gaps or crevices between the flight and the belt. The vulcanized bond between the flight and the belt is so strong that the flight does not pull out in the contemplated use of the flight belt. The flights may be of any desired height, width and spacing on the belt. Usually the flights are perpendicular to the belt, but they may have any other desired angular relation to the belt.

The flight belt of the invention is of substantially uniform thickness throughout, since the flights are secured to the belt without any significant increase in the belt thickness approximate the flights. This insures uniform flexing of the belt as it passes over its cooperating pulleys such as 13 in Fig. 5 where it will be noted that the bases of the flights follow the contour of the pulley without damage to the bond between the flight and the belt. Such uniform flexing of the belt prevents any undue strain on the flights which might tend to loosen them or rupture the belt. Because of the complete absence of any voids or openings in the belt, it is impossible for granular or other material to insinuate itself between the flight and the belt with consequent damage to one or the other as the belt passes over the pulleys on which it is operatively mounted.

I claim:

1. In a conveyor belt of the laminated fabric type having longitudinally spaced upstanding flights, the improvement characterized in that each upstanding flight is formed of a laminated fabric structure of the same type as the belt itself, at least two plies of said structure having been stripped to provide three longitudinally spaced sections of reduced thickness, two of said sections being relatively long and positioned on opposite ends of the structure while the third section is positioned between two unstripped sections of equal length and of a thickness approximately half the length of said third section, said two unstripped sections being folded into bonding contact with each other to form an upstanding flight, and said two relatively long sections being oppositely bent in angular relation to said contacting sections and secured by vulvanization in a mating cut-out recess of the belt.

2. In a conveyor belt of the laminated fabric type having longitudinally spaced upstanding flights, the improvement characterized in that each upstanding flight is formed of a laminated fabric structure of the same type as the belt itself and initially having four plies of fabric, one outer ply having been stripped to leave a three-ply structure, two of the remaining plies on the stripped side of said three-ply structure having been stripped to leave three longitudinally spaced single-ply sections the outer two of which are relatively long and positioned on the opposite ends of the structure while the third is positioned between two remaining three-ply sections of equal length and of a thickness approximately half the length of said third single-ply section, said two three-ply sections being folded into bonding contact with each other to form an upstanding flight, and said two outer single-ply sections being oppositely bent in angular relation to said contacting three-ply sections and secured by vulcanization in a mating one-ply deep cut-out recess of the belt.

3. In a conveyor belt of the vulcanized laminated fabric type having longitudinally spaced upstanding flights, the improvement characterized in that each upstanding flight is formed of a laminated fabric structure initially comprising two narrowly spaced multi-ply sections cemented to a back-up ply with a substantial length thereof extending beyond each of the two opposite edges of said multi-ply sections, the combined thickness of said multi-ply sections being approximately the length of said space therebetween, said multi-ply sections being folded into bonding contact with each other with the back-up ply on the outside, and the extending ends of said back-up ply being oppositely bent to positions in the same plane substantially at right angles to said contacting multi-ply sections and secured by vulcanization in a mating recess cut out of the belt, the depth of the recess and the thickness of said back-up ply being approximately the same.

4. The method of forming longitudinally spaced upstanding flights on a conveyor belt of the vulcanized laminated fabric type which comprises stripping at least two plies from a laminated fabric structure of the same type as the belt itself to provide three longitudinally spaced sections of reduced thickness, two of said sections being relatively long and positioned on opposite ends of the structure while the third section is positioned between two unstripped sections of equal length and of a thickness approximately half the length of said third section, folding said two unstripped sections into contact with each other with a layer of cement between the contacting surfaces, oppositely bending said two relatively wide sections of reduced thickness to angular positions with respect to said contacting sections, forming a mating cut-out recess in the face of the belt of the same effective length, width and thickness as said combined oppositely bent sections, and securing said oppositely bent sections in the mating recess of the belt by vulcanization.

5. A cleated belt comprising a belt web including a number of superposed plies and having a depressed portion from which certain of said web plies are omitted, a cleat including a number of superposed plies and having three spaced depressed portions from which certain of said cleat plies are omitted, said cleat being folded upon itself adjacent the central one of said three depressed portions to provide a rounded extremity of said cleat and the other two of said three depressed portions being disposed to curve into the depressed portion of said web, and means for bonding all of said plies together.

6. A cleated belt comprising a belt web including a number of superposed plies and having a depressed portion from which at least one of said web plies is omitted, a cleat including a number of superposed plies and having three spaced depressed portions from which certain of said cleat plies are omitted, said cleat being folded upon itself adjacent the central one of said three depressed portions to provide a rounded extremity of said cleat and the other two of said three depressed portions being disposed to curve into the depressed portion of said web, and means for bonding all of said plies together.

No references cited.